Patented Mar. 10, 1936

2,033,870

UNITED STATES PATENT OFFICE 2,033,870

TREE CAVITY FILLER

Claude H. Smith, Tallmadge, Ohio, assignor to Wingfoot Corporation, Wilmington, Del., a corporation of Delaware No Drawing. Application May 10, 1934, Serial No. 724,950

6 Claims. (Cl. 47—8)

This invention relates to a tree-cavity filler which comprises rubber distillation residue.

Difficulty has been experienced in finding a suitable filler for tree cavities. Cement has been used to quite a large extent but this is unsatisfactory for several reasons. The first objection to the use of cement is that the cavity must first be adapted to hold such a filler. This is usually done by driving nails or spikes into the walls of the cavity to such a distance that they protrude sufficiently to keep the cement in place after it has dried out. Molten fillers have been used to some extent but they are objectionable because they must be applied in a hot and molten condition and this is often difficult to accomplish.

The present invention relates to a plastic filler which may be trowelled into the cavity of a tree. After volatilization of the solvent used, the filling will not flow at summer heat temperatures and will not become brittle and crack in the winter time.

The preferred form of the invention is a tree filler made from blown asphalt and residue obtained by distilling rubber to a Shore hardness of about 80 at 30° C. With the asphalt and rubber are mixed a filling material, preferably sawdust, and a plasticizer such as mineral oil. Sufficient solvent is added to make the material plastic but not too thin. A composition which can be trowelled will generally be most satisfactory. A satisfactory filler was made from 100 parts vulcanized rubber distillation residue with a Shore hardness of 80, 233 parts blown asphalt with a melting point of about 350° F., 333 parts asbestine, 32½ parts light machine oil and 233 parts varnish maker's naphtha (the parts being by weight).

The composition is preferably prepared by melting the rubber residue and asphalt and then adding the sawdust to the molten mixture. The asphalt is preferably melted in a fire heated kettle and then poured into a heavy duty Day mixer. To the molten asphalt is added first the rubber residue and then the mineral oil. The asbestine is next added, slowly and uniformly and mixing continued until the mass is uniform. Increments of sawdust and naphtha are added alternately until they are all in the mixer. When the batch is uniform in appearance the process is completed.

Blown asphalt preferably employed in the above formula is that marketed by the Robertson Asphalt Company as their 400—A. It has a flow point of 400° F. and is produced by blowing with air the residue from the distillation of petroleum. Blown asphalt of higher or lower melting point may be used. Natural asphalts and particularly natural asphalts not so hard as gilsonite and the harder asphalts may be used. Harder asphalts mixed with softer natural or blown asphalts may be used. The ratio of asphalt to rubber residue used may be varied depending upon the nature of the asphalt and residue employed. With an extremely soft asphalt a somewhat harder rubber residue may be utilized. In general, however, it will be most satisfactory to use a blown asphalt with a flow point of about 350° F. and a rubber residue with a Shore hardness of about 80 at 30° C. Softer residues when heated evolve a gas and are not as permanently stable as residues of this hardness. A harder rubber residue is liable to be brittle, although mixed with a soft asphalt, a satisfactory filler may be produced.

The rubber residue may be prepared by distilling a crude rubber or by the distillation of vulcanized rubber such as old rubber tires, tubes, air bags, etc. Before distilling, scrap rubber is separated from most or preferably all of the fibrous material contained in it. Any large amount of fiber will char and prevent a satisfactory, workable residue from being obtained.

L. E. Weber in the "Chemistry of Rubber Manufacture", gives the following as the products obtained by the dry distillation of washed and dried, fine, hard Para rubber: isoprene ($C_5H_8$) 6.2%, dipentene ($C_{10}H_{10}$) 46.0%, heveene ($C_{15}H_{24}$) 17%, polyterpenes 26.8%, carbon residue 1.9%, mineral residue 0.5%, loss 1.4%. This indicates that the rubber residue found most satisfactory for the tree filler of this invention is a rubber residue produced by distilling the isoprene and most or all of the dipentene from the rubber without removing any substantial amount of heveene. This is obtained by distilling the rubber under atmospheric pressure to a temperature of about 250–300° C. while minimizing decomposition as much as possible. With crude rubber the distillation will be continued to a temperature of about 260° C.

Instead of sawdust other filler such as cotton linters or dried wood pulp may be used although saw dust has proved most satisfactory. It is added in such an amount that the soft plastic material retains its shape under normal temperature changes and without interfering with the trowelling of the composition.

Instead of mineral oil other plasticizers may be used such as tung, cotton seed, or corn oil.

A small amount of disinfectant is advantageously added to the cavity filler. Fungicides, insecticides, etc., may be used. Volatile material such as para di chlor benzene or less volatile substances such as creosote oil may be employed. A volatile disinfectant will penetrate the wood surrounding the cavity to some extent. If the dead material has been entirely removed from the cavity as it should be in all tree surgery a non-volatile disinfectant may be satisfactorily employed.

In order to fill the cavity in a tree the punk and dead wood is first removed. Where desirable the surface of the cavity may first be painted with a film of the material to be used as the filler, omitting the inert material, although such pre-treatment is unnecessary. The filler may be applied directly to the cleaned cavity without previous treatment. The filler is ordinarily put in place by trowelling. No after treatment is necessary as on evaporation of the solvent the filler becomes solid and sets firmly. It does not become hard and brittle when cold and does not flow at high summer temperatures. Where used in a small cavity the bark will quickly grow over the filler.

The distillation of rubber and a rubber residue suitable for use in carrying out the present invention are disclosed and claimed in my co-pending application Serial No. 724,951 filed May 10, 1934.

I claim:

1. As a tree-cavity filler, a composition comprising asphalt, residue from the distillation of rubber and a large amount of inert filler.

2. As a tree-cavity filler, a composition comprising asphalt, residue from the distillation of rubber, a large amount of inert filler and a disinfectant.

3. As a tree-cavity filler, a composition comprising asphalt and residue from the distillation of rubber in such a ratio as to give a soft plastic mass, sufficient inert material to prevent such plastic mass from flowing at summer temperatures and a plasticizer and sufficient solvent to render the composition trowellable.

4. As a tree-cavity filler, a composition which does not flow at high summer temperatures or become brittle at winter temperatures and which comprises a large amount of inert filler, blown asphalt and residue from the distillation of rubber, which residue has a Shore hardness of about 80 at 30° C.

5. As a tree-cavity filler, a composition which on evaporation of the volatile solvent does not flow at high summer temperatures or become brittle at winter temperatures and which comprises a large amount of inert filler, a plasticizer, a volatile solvent, blown asphalt and residue from the distillation of rubber, which residue has a Shore hardness of about 80 at 30° C.

6. A trowellable tree-cavity filler which comprises rubber distillation residue and a volatile disinfectant.

CLAUDE H. SMITH.